United States Patent [19]

Chireau et al.

[11] 4,091,185
[45] May 23, 1978

[54] TITANIUM/SILVER-CONTAINING CELLULOSIC SEPARATOR FOR ELECTROCHEMICAL CELLS

[75] Inventors: Roland F. Chireau, Quaker Hill; Sandor F. Seidman, Westbrook, both of Conn.

[73] Assignee: Yardney Electric Corporation, Pawcatuck, Conn.

[21] Appl. No.: 709,137

[22] Filed: Jul. 27, 1976

[51] Int. Cl.$^2$ ............................................ H01M 2/16
[52] U.S. Cl. .................................. 429/144; 429/206; 429/219; 429/251; 29/623.1
[58] Field of Search ............... 429/144, 251, 252, 249, 429/247, 50, 219, 206; 29/623.1

[56] References Cited

U.S. PATENT DOCUMENTS

| 3,269,869 | 8/1966 | Mendelsohn | 429/251 |
| 3,364,077 | 1/1968 | Arrance et al. | 429/251 |
| 3,450,566 | 6/1969 | Solomon et al. | 429/144 |
| 3,539,396 | 11/1970 | Wagner | 429/247 |
| 3,711,336 | 7/1973 | Smatko | 429/247 |

Primary Examiner—Donald L. Walton
Attorney, Agent, or Firm—Donald E. Nist

[57] ABSTRACT

Semi-permeable silver-impregnated cellulosic materials for use as electrochemical cell separators are provided with a titanium-silver complex content by subjecting a cell in which the silver-impregnated cellulosic material is employed as a separator and which contains an ionizeable titanium-containing compound, to a series of discharge/charge cycles.

18 Claims, 2 Drawing Figures

TITANIUM/SILVER-CONTAINING CELLULOSIC SEPARATOR FOR ELECTROCHEMICAL CELLS

BACKGROUND OF THE INVENTION

This invention relates to electrochemical generators or batteries. In particular, it relates to separators use in combination with electrochemical batteries such as silver/zinc batteries.

Cellulosics, such as cellophane or sausage casing, are almost exclusively used at present as main separator materials in silver/zinc batteries. However, cellulose such as cellophane is not stable in the alkaline electrolyte environment which is employed in such batteries. It degrades slowly, even in the absence of oxygen, and, of course, the presence of oxygen in the electrolyte markedly speeds up the rate of degradation of the cellulose. Additionally, because silver oxide of the positive electrode in these batteries is sufficiently soluble in the battery electrolyte, degradation of the cellulose is further increased by the presence of such a strongly oxidizing metallic oxide in the electrolyte. The silver oxide attack takes the form of deposits of metallic slver in the cellophane which lead to short-circuit failure.

In U.S. Pat. No. 3,013,099, issued Dec. 12, 1961, and entitled "Separator for Electrical Batteries", there is described an improved separator material which provides an improvement in the functioning of electrochemical batteries in general and silver/zinc batteries in particular. As described therein, a silver cellulosate separator is made by causing silver particles to react with the aldehyde groups present in the cellulose chain to produce a silver salt. This modified cellulose is more resistant to oxidation and hydrolysis than is cellophane. In spite of this improvement, the theoretical useful life of silver/zinc batteries is believed to be substantially longer than the life of presently available silver/zinc batteries. Therefore, there remains a need for an even better separator for such batteries.

SUMMARY OF THE INVENTION

An improved cellulosic membrane for use in electrochemical cells is made by subjecting a silver/zinc cell containing a silver-impregnated, cellulose separator and containing an ionizeable, titanium-containing compound to a series of discharge and charge cycles. Such cycling produces a reaction between the titanium and silver which results in the formation, in the separator material, of an insoluble silver-titanium complex.

Several advantages over the prior art are realized from the herein-described silver-titanium complex-impregnated cellulose separator material. These advantages include improved oxidation resistance of the cellulose, retarded attack by silver (from solubilized silver oxide) on the cellulose, and improved wet strength of the cellulose in the electrolyte. Because these factors greatly extend the life of cellulose separators in electrochemical cells, the theoretical lives of the latter are more nearly realized than is the case using presently-available separator materials.

DESCRIPTION OF THE PREFERRED EMBODIMENT

Figure 1:
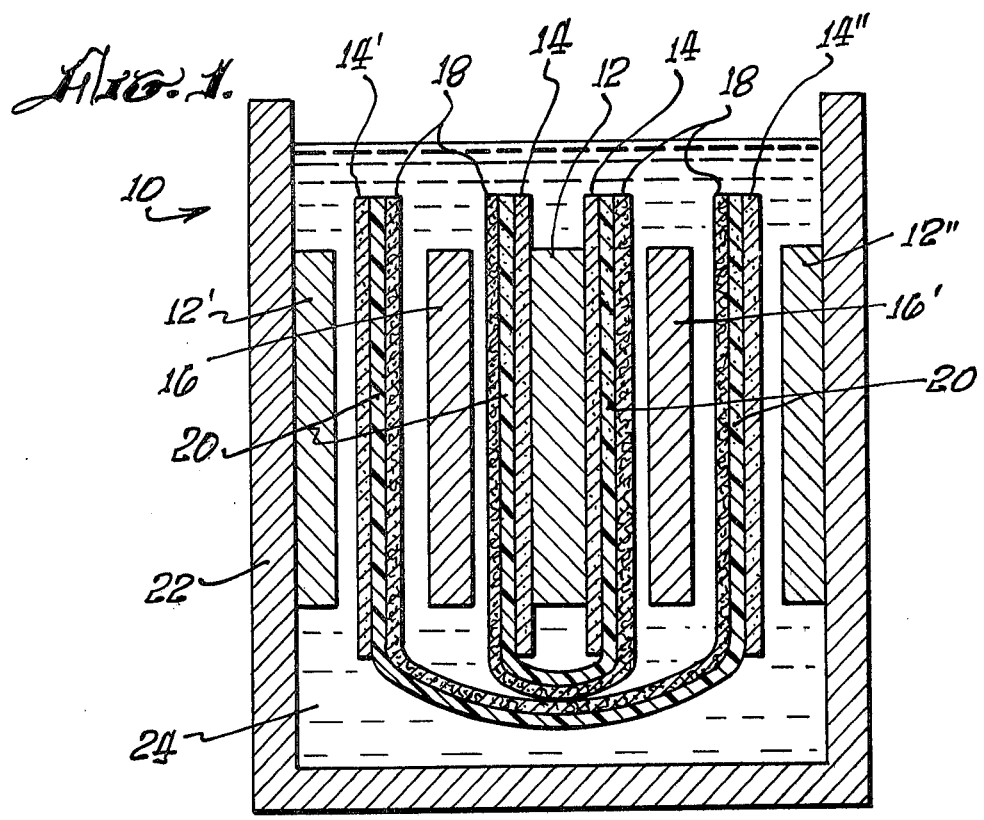
FIG. 1 is a cross-sectional, elevational view of a typical silver/zinc cell incorporating the herein-described invention.

As used herein, the term "cellulosic material" means cellulose-containing compositions which can be utilized to form semi-permeable separators for use in electrochemical cells and includes the following materials: regenerated cellulose such as cellophane; paper; sausage casing; cellulose film made from cast dentrated nitrocellulose; high wet modulus rayon; and cellulose film made from cellulose triacetate by removal of the acetate group (the Fortisan process).

For simplicity of description, the herein-described separator material will be described with reference to silver/zinc cells, although it could be used in other alkaline rechargeable cells including cells employing silver and a material which is more electronegative than silver as the electrodes. Examples of such other cells include nickel/zinc, nickel/cadmium and mercuric-oxide/cadmium.

The herein-described separator material is a titanium-silver complex-impregnated cellulosic material with the titanium-silver complex (TSC) bonded to the cellulose to form a water-insoluble complex which is also insoluble in the electrolytes used in silver/zinc cells.

The TSC-impregnated cellulosic material is made by first impregnating a cellulosic material with silver as described in U.S. Pat. Nos. 3,013,099 and 2,785,106 which are incorporated herein by reference. In brief, an aqueous solution of a silver salt such as silver nitrate is heated to a temperature of about 50° C to about 100° C. Preferably, this aqueous solution contains a catalyst such as sodium or potassium acetate. The cellulosic material is immersed in the heated aqueous solution for a time sufficient for the silver ions to combine or react with the cellulosic material to provide the latter with the required amount of silver. A silver-impregnated cellulosic material containing about 1 – 2% by weight silver can be produced in 30 – 60 minutes.

It is believed that the silver reacts with the aldehyde groups in the cellulosic material to form a silver cellulosate compound since the silver in this form is insoluble in water and is not readily separated from the cellulose by mechanical means.

The resulting silver-impregnated cellulosic material is next subjected to a series of discharge/charge cycles in an electrochemical environment which includes a titanium-containing compound. This can be done as follows with reference to a silver/zinc cell.

A positive silver oxide electrode is wrapped with the silver-impregnated cellulosic material to form a silverized cellulosic separator, after which a zinc electrode is placed against the wrapped silver oxide electrode. A titanium-containing compound is added to the silver/zinc cell. This addition can be accomplished in several ways. For example, the titanium-containing compound may be added to the negative (zinc) electrode, or it can be painted onto the silverized cellulosic material, or it can be added to the electrolyte, or it can be impregnated onto a thin, porous inert matrix (sheet) which can be placed between the silverized cellulosic separator and the zinc electrode and which then functions as a negative interseparator. The silver/zinc cell components are then fitted together in a suitable casing to which there is added an aqueous electrolyte as is well known. As an example, the electrolyte may be an alkaline solution such as aqueous potassium or sodium hydroxide. This assembled cell is subjected to a series of discharge/- charge cycles for a time sufficient to produce a desired amount of TSC-impregnated cellulosic material. Formation of the titanium-silver complex appears to start with the first cycle and is observed as a violet-black coloration of the cellulosic material.

The titanium-containing compound for use in making the herein-described TSC-impregnated cellulosic material is a material which forms ions or charged colloidal particles which migrate to the positive electrode in the electrochemical environment. It is not necessary that the titanium-containing compound be soluble in the electrolyte, although it may be. The term "ionizeable titanium-containing compound" is used herein and in the claims to designate titanium-containing compounds having the foregoing characteristics. Useful titanium-containing materials include: potassium and sodium titanate; zinc and zinc magnesium titanates; cerium, calcium and magnesium titanates; barium titanate; and lead and lead zirconate titanates.

Figure 2:
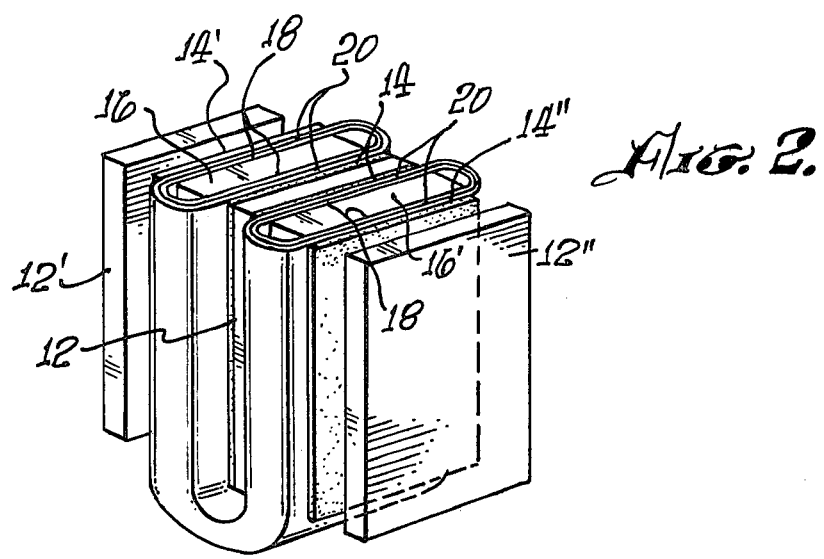
FIG. 2 is a perspective view of the positive and negative electrodes and separator of the cell illustrated in FIG. 1 separate and apart from the cell itself.

Referring to FIGS. 1 and 2, a typical silver/zinc cell incorporating the herein-described invention will now be described. The cell 10 includes a centrally-disposed, negative electrode 12 which, in this example, consists of 95% by wt. zinc oxide and 5% by wt. mercuric oxide. Wrapped around the negative electrode 12 is a negative interseparator 14 consisting of a single layer of paper comprising 85% by wt. pigmentary potassium titanate (PKT) and 15% by wt. asbestos fibers. A pair of positive electrodes 16, 16' which consist of silver which, in the charged state, is converted to silver oxide are "U-wrapped" (FIG. 2) with a layer of porous, bibulous, highly absorbent felt which forms a positive interseparator 18. The latter, in turn, is wrapped in a layer (one or more sheets) of silverized cellophane (Dupont PUDO 193) prepared as described herein which forms a separator 20. This "U-wrapped" assembly is positioned within the cell 10 so that the positive electrodes 16, 16' are disposed on opposite sides of the negative electrode 12 with the positive interseparator 18 and separator 20 extending from one positive electrode 16 under the negative electrode 12 to the other positive electrode 16'.

The inwardly facing sides of the U-shaped separator 20 lie against the negative interseparator 14 (which is wrapped around the negative electrode 12) whereas the outwardly-facing sides of the separator lie against another pair of negative interseparators 14', 14" which, in turn, extend partially around a second and a third negative electrode 12', 12", which are positioned adjacent to the cell case 22. The negative interseparators 14', 14" and the negative electrodes 12', 12" are made from the same materials as their counterparts designated by the numerals 12 and 14, respectively. After all of the described components have been assembled in the cell case 22, an electrolyte 24 is added thereto.

By subjecting the cell 10 to a series of discharge/charge cycles as described herein, some of the titanate present in the negative interseparators 14, 14', 14" migrates to the separator 20 to form a titanium-silver complex.

This invention will now be further described by the following Examples.

EXAMPLE 1

A strip of 193-PUDO cellophane sheet (weighing about 0.0035 gm/cm²) was immersed in a 1% (by wt.) silver nitrate solution which also contained 1% of sodium acetate and which had been heated to a temperature of 80° C. The immersion lasted for 1 hour. After the silver-impregnated cellophane had been washed and dried, it was found to have a silver content of 1% (by wt.).

A silver oxide electrode (+) was wrapped with several layers of the silver-impregnated cellophane (separator). Two zinc (−) electrodes were placed on opposite sides of the wrapped silver oxide electrode. These elements were placed in a suitable casing to which there was added an aqueous potassium hydroxide solution (31% by wt. of KOH) as the electrolyte. To the latter, there was added 0.3 grams of potassium titanate.

This cell was subjected to 40 discharge/charge cycles under the following conditions. The cell was discharged at a constant current of 1 ampere to 1.0 volt per cell (100% depth of discharge), then recharged at constant current (0.25 ampere) for 12 hours. Cycling continued until shorting occurred. A violet-black color was noted on the impregnated cellophane separator upon its removal from the cell. After the cellophane separator was washed and dried, it was found to have a titanium-silver complex content of 0.2% by weight.

EXAMPLE 2

Example 1 was repeated except that sodium titanate, magnesium titanate, zinc titanate, calcium titanate and cerium titanate were each substituted for the potassium titanate used therein with substantially the same results.

EXAMPLE 3

Example 1 was repeated with substantially the same results except that the potassium titanate was sprayed on the surface of the separator. The sprayed separator sheet was then used to wrap the positive electrodes.

EXAMPLE 4

A number of silver/zinc cells as shown in FIG. 1 were assembled using the components and materials previously described herein with reference to that Figure. Each of the positive and negative electrodes measured 41.3 mm. + 38.1 mm + 0.89 mm. (positive)/1.14 mm. (negative).

The separator was made by first treating regenerated cellulose sheet with a 1% (by wt.) solution of AgNO₃ containing about 1% of sodium acetate heated to 80° C and washing and drying the resulting silverized cellulose (C-19). Thereafter, the silver in the C-19 was complexed to produce TSC-containing cellulose (designated as C-19T) using potassium titanate as described in Example 1 hereof, except that the titanate was included in various other component parts of each cell as described hereinafter. This separator had a total thickness of 0.061 mm. (two layers each 0.030 mm. thick).

The negative interseparators were each 0.022 mm. thick and were prepared as described hereinafter. The electrolyte was an aqueous solution of 40% potassium hydroxide. The nominal capacity of the cell was 2 ampere hours when discharged at the 2-hour rate.

Three cells (A, B, C) were made up as described in which the negative interseparators incorporated therein the titanate for producing the C-19T. Each such interseparator was prepared as follows. An aqueous slurry consisting of 85% pigmentary potassium titanate, 15% chrysotile asbestos fiber and 0.5% carboxymethyl cellulose, (dry solids basis) was cast onto a moving belt. The slurry was dried in an oven at 100° C. The finished sheet was calendered to final thickness by passing it through suitable rolls.

Three other cells (D, E, F) were made as described in which the negative interseparators also incorporated the titanate with each interseparator being made as described above with respect to cells A, B and C except that cerium titanate was utilized in place of potassium titanate.

Three other cells (G, H, K) were made up as described except that the potassium titanate was included in the negative electrode and the negative interseparator consisted only of a nylon, non-woven felt (Pelon 2505K). The silver cellulose separator was complexed with the titanium from the negative electrode as described herein. Each negative electrode was made by adding 5 wt. % of pigmentary potassium titanate (PKT) fibers to the standard negative electrode mix to provide a test negative electrode mix comprising, by weight, 94.5% ZnO, 0.5% HgO, and 5% PKT fibers. In order to form the negative electrode, these constituents were first combined with distilled water and carboxy-methyl cellulose binders, then agitated together in a blender until a uniform thixotropic suspension was obtained, after which the resulting slurry was cast between two layers of carrier paper, e.g., Aldex paper, and passed under an oscillating doctor blade to form long strips of electrode material. These strips were dried at elevated temperatures and cut to size for use as electrodes. The latter were pressed to the desired thickness and paired with a conductive grid (expanded metal or mesh) to form a sandwich-type electrode assembly which pressed to form a unitary composite electrode.

For control purposes, three cells (L, M, N) were assembled which were substantially identical to cells A – F except that they contained no titanium-bearing compound.

Each of the cells was subjected to the same test conditions consisting of charging the cells at a constant current of 0.25 amperes for 12 hours and discharging at 1 ampere to 1.0 volt per cell (100% DOD) until shorting occurred. The test results are given in the Table.

TABLE

| Cell | Separator | Cycles to Short Max. | Cycles to Short Avg. | Observations |
|---|---|---|---|---|
| A,B,C | C-19T (titanate from inter-separator) | 85 | 66 | C-19T very dark in color. Spectographic analysis shows 0.2% Ti in separator. Electrical resistance is 0.030 m.ohms per sq. in. avg. |
| D,E,F | C-19T (titanate from inter-separator) | 85 | 58 | |
| G,H,K | C-19T (titanate from neg. electrode) | 42 | 36 | |
| L,M,N | C-19 (no titanate) | 23 | 20 | C-19 light in color, oxidized. Electrical resistance is 0.015 m.ohms per sq. in. avg. |

As will be noted from the Table, substantially superior results are obtained when utilizing a cellulose separator containing a titanium-silver complex as compared with use of a silverized cellulose separator. It is also to be noted from the Table that the best results were obtained when the titanate was initially incorporated in the negative interseparator.

In summary, there has been described an improvement in secondary alkaline cells, which improvement comprises the presence in such cells of a cellulose separator incorporating a titanium-silver complex which is strongly bonded or attached to the cellulose so that it is thereby rendered insoluble in the electrolyte environment encountered in such cells. Formation of the titanium-silver complex may be realized in situ by incorporating a titanate compound in a cell component such as the negative interseparator and subjecting the cell to cycling to cause the titanate to complex with silver in a silver-impregnated (bonded) cellulosic separator initially employed in the cell.

We claim:

1. In an electrochemical generator, the combination of a positive silver electrode, a negative electrode, an alkaline electrolyte and a separator interposed between said positive and negative electrodes comprising titanium-silver complex-impregnated cellulose.

2. In an electrochemical generator, the combination of claim 1 wherein said cellulose is selected from the group consisting of: regenerated cellulose; paper; sausage casing; cellulose film made from cast denitrated nitrocellulose; high wet modulus rayon; and cellulose film made from cellulose triacetate by removal of the acetate group.

3. In an electrochemical generator, the combination of claim 1 wherein said negative electrode comprises a metal more electronegative than silver.

4. In an electrochemical generator, the combination of a positive silver electrode, a negative electrode, a silver-cellulose separator interposed between said positive and negative electrodes, and an ionizeable titanium-containing compound carried within said electrochemical generator for producing titanium-containing charged particles positioned to migrate toward said positive electrode for combination with said silver of said silver cellulose to form titanium-silver complex-impregnated cellulose when said electrochemical generator is subjected to a discharge/charge sequence.

5. In an electrochemical generator, the combination of claim 4 wherein said titanium-containing compound is carried in said negative electrode.

6. In an electrochemical generator, the combination of claim 4 which further includes a negative interseparator interposed between said separator and said negative electrode and wherein said negative interseparator comprises said titanium-containing compound.

7. In an electrochemical generator, the combination of claim 4 which further includes an alkaline electrolyte.

8. In an electrochemical generator, the combination of claim 4 wherein said positive electrode comprises silver and said negative electrode comprises a metal more electro-negative than silver.

9. In an electrochemical generator, the combination of claim 8 which further includes an alkaline electrolyte.

10. In an electrochemical generator, the combination of claim 4 wherein said titanium-containing compound is selected from the group consisting of: potassium and sodium titanate; zinc titanate; and calcium and magnesium titanate; cerium titanate; barium titanate; zinc magnesium titanate; and lead and lead zirconate titanates.

11. In an electrochemical generator, the combination of a positive electrode comprising silver, a zinc negative electrode, a separator disposed between said positive and negative electrodes which comprises titanium-silver complex-impregnated cellulose, an alkaline electrolyte, and a negative interseparator disposed between said separator and said negative electrode, said negative interseparator comprising an ionizeable titanium-containing compound.

12. In an electrochemical generator, the combination of claim 11 wherein said titanium-containing compound is selected from the group consisting of: potassium and sodium titanate; zinc titanate; and calcium and magnesium titanate; cerium titanate; barium titanate; zinc magnesium titanate; and lead and lead zirconate titanates.

13. A method of making an improved silver cellulose separator for use in electrochemical generators, comprising:
   assembling an electrochemical generator comprising a positive silver electrode, a negative electrode, an alkaline electrolyte, and a silver cellulose separator disposed between said positive and negative electrodes;
   introducing an ionizeable titanium-containing compound into said electrochemical generator so that said titanium-containing compound will be ionized for reaction with the silver in said separator when said electrochemical generator is subjected to a discharge/charge sequence; and
   subjecting said electrochemical generator to a series of discharge/charge cycles until a sufficient amount of titanium has reacted with the silver in said silver cellulose separator to produce a predetermined amount of a titanium-silver complex connected by bonding to said cellulose.

14. The method of claim 13 wherein said negative electrode comprises a metal more electronegative than silver.

15. The method of claim 14 wherein said titanium-containing compound is selected from the group consisting of: potassium and sodium titanate; zinc titanate; calcium and magnesium titanate; cerium titanate; barium titanate; zinc magnesium titanate; and lead and lead zirconate titanates.

16. The method of claim 13 wherein said titanium-containing compound is selected from the group consisting of: potassium and sodium titanate; zinc titanate; calcium and magnesium titanate; cerium titanate; barium titanate; zinc magnesium titanate; and lead and lead zirconate titanates.

17. The method of claim 13 wherein said electrochemical generator is assembled to include a negative interseparator disposed between said negative electrode and said silver cellulose separator and wherein said titanium-containing compound is introduced into said electrochemical generator by inclusion thereof in said negative interseparator.

18. The method of claim 13 wherein said titanium-containing compound is introduced into said electrochemical generator by inclusion thereof in said negative electrode.

* * * * *